Sept. 29, 1942.  V. MONTE  2,297,577
COUNTERBALANCE ATTACHMENT FOR FISHING RODS
Filed June 19, 1941
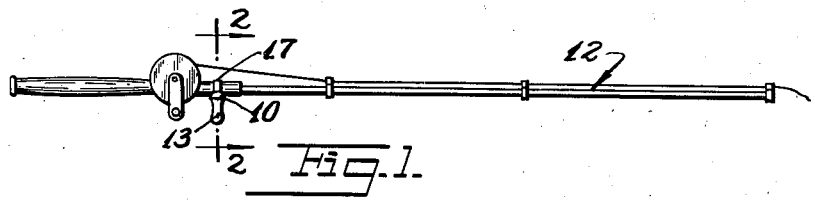
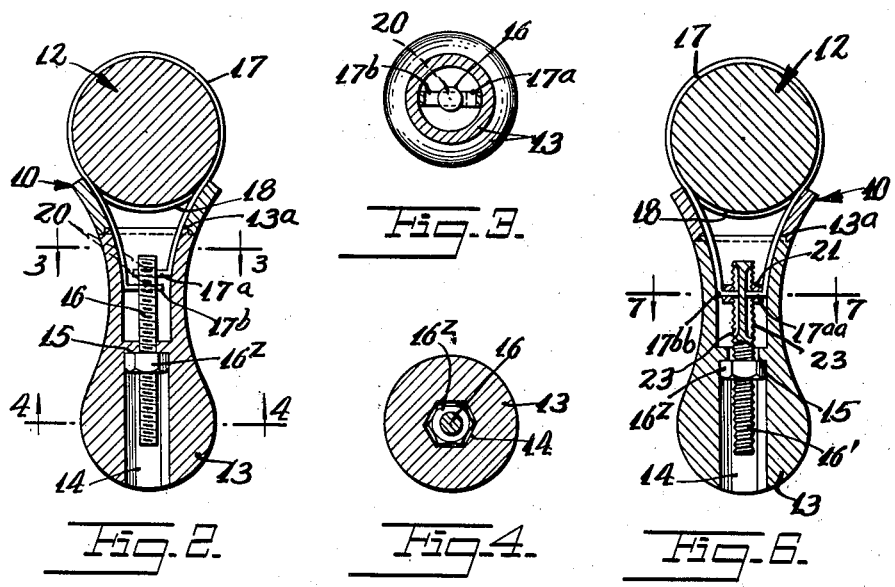
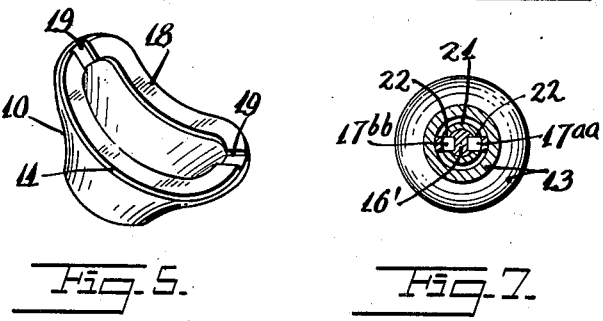
INVENTOR
*Victor Monte*
BY
ATTORNEY Patented Sept. 29, 1942

2,297,577

UNITED STATES PATENT OFFICE 2,297,577

COUNTERBALANCE ATTACHMENT FOR FISHING RODS

Victor Monte, Woodhaven, N. Y.

Application June 19, 1941, Serial No. 398,767

3 Claims. (Cl. 43—23)

This invention relates to new and useful improvements in a counterbalance attachment for fishing rods.

The invention proposes to construct the counterbalance in the form of a handle which may be attached upon the side of the fishing rod and which may be gripped and held to steady and counterbalance the rod.

More specifically, the invention proposes to characterize the counterbalance by a flange member having a concave side adapted to set against the side of the fishing rod, and a handle mounted on the flange member in a certain way.

It is proposed to rotatively mount the handle on the flange member and to associate a screw and nut therewith, and a gripping strap in such a manner that the strap may encircle the fishing rod and be drawn tight merely by rotating the handle.

Still further the invention proposes a novel arrangement for securing the ends of the strap to the said screw at different points along the length of the screw.

Another object is the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a fishing rod provided with a counterbalance attachment constructed in accordance with this invention.

Fig. 2 is an enlarged vertical sectional view taken on the line 2—2 of Fig. 1.

Fig. 3 is a horizontal sectional view taken on the line 3—3 of Fig. 2.

Fig. 4 is a horizontal sectional view taken on the line 4—4 of Fig. 2.

Fig. 5 is a perspective view of the flange member.

Fig. 6 is a sectional view similar to Fig. 2 but illustrating a modified construction.

Fig. 7 is a horizontal sectional view taken on the line 7—7 of Fig. 6.

The counterbalance attachment for fishing rods, in accordance with this invention, includes a flange member 10 having a concave side 11 adapted to fit against the side of a fishing rod 12. A handle 13 is rotatively mounted upon the bottom of the flange member 10 and is formed with a non-circular opening 14 having a shoulder 15. A nut 16$^z$ is set into the non-circular opening 14 so as to be non-rotative, and against the shoulder 15 and threadedly engages a screw 16.

This screw 16 extends axially through the handle 13. A strap 17 encircles the fishing rod 12 and has its ends 17$^a$ and 17$^b$ extending through the flange member 10 and attached to the screw 16.

A rubber gasket 18 is interposed between the flange member 10 and the side of the fishing rod 12 so as to pad the contacting portions of these parts. The gasket 18 is shown formed with two slots 19 through which the strap 17 passes. The handle 13 has a recessed portion 13$^a$ engaging a groove formed in the bottom portion of the flange 10 for rotatively connecting these parts. The non-circular opening 14 is hexagonal in transverse cross section. The nut 16$^z$ is of hexagonal shape and fits into the opening 14 in a manner to be non-rotative.

The end portions 17$^a$ and 17$^b$ of the strap 17 engage through a pair of spaced openings 20 formed through the inner end portion of the screw 16.

The operation of the device is as follows:

The handle 13 may be gripped to steady the fishing rod 12 during fishing. When desired the counterbalance attachment may be removed by turning the handle 13 to cause the screw 16 to move upwards relative to the handle 13. This loosens the strap 17 so that it loses its grip on the rod 12. Then the counterbalance device may be slipped off the fishing rod. It may be replaced when desired.

In Figs. 6 and 7 a modified form of the invention has been disclosed which is very similar to the preferred form, distinguishing merely in the way in which the end portions 17$^{aa}$ and 17$^{bb}$ are attached to the screw 16'. In accordance with this form of the invention a collar 21 is threadedly mounted on the top end of the screw 16'. This collar 21 is formed with a pair of diametrically opposite openings 22. The ends 17$^{aa}$ and 17$^{bb}$ engage into these openings 22. These latter ends also extend into longitudinal grooves 23 formed along the sides of the screw 16'. Thus the screw 16' is held non-rotative. In other respects this form of the invention is similar to the previous form.

The counterbalance device may be removed from the fishing rod 12 by turning the handle 13 to cause the screw 16' to move upwards and so slacken the strap 17. The device may then be slipped from the fishing rod.

The flange member 10 may then be slipped upwards on the strap 17 to expose the collar 21. The ends 17aa and 17bb may then be pulled out from the slots 23 and the collar 21. The collar 21 may then be turned to move upwards or downwards on the screw 16' so as to vary the relative position of these parts, and better accommodate the strap 17 to fishing rods of different diameters. The ends 17aa and 17bb may be re-engaged through openings 22 in the collar 21 and into the grooves 23. The counterbalance device may then be mounted on the fishing rod as already understood.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A counterbalance attachment for fishing rods having a flange member setting against said rod and supporting a handle having a screw movably mounted therein and carrying a nut disposed within a non-circular opening and bearing against a shoulder formed in said handle and through which said screw freely extends, a strap encircling said fishing rod and having its ends extended into said handle through said flange member, and said strap having its ends bent to extend at right angles to the length of said screw and extended into openings formed in said screw for releasably attaching said ends to said screw to prevent said screw from turning when said handle is turned.

2. A counterbalance attachment for fishing rods having a flange member setting against said rod and supporting a handle having a screw movably mounted therein and carrying a nut disposed within a non-circular opening and bearing against a shoulder formed in said handle and through which said screw freely extends, a strap encircling said fishing rod and having its ends extended into said handle through said flange member, and means for releasably attaching said ends of said strap at various positions along the length of said screw and for simultaneously preventing said screw from turning when said handle is turned.

3. A counterbalance attachment for fishing rods having a flange member setting against said rod and supporting a handle having a screw movably mounted therein and carrying a nut disposed within a non-circular opening and bearing against a shoulder formed in said handle and through which said screw freely extends, a strap encircling said fishing rod and having its ends extended into said handle through said flange member, and means for releasably attaching said ends of said strap at various positions along the length of said screw and for simultaneously preventing said screw from turning when said handle is turned, comprising longitudinal grooves formed in oppositely disposed sides of said screw, and a collar threadedly engaged upon said screw and formed with openings alignable with said grooves in certain turned positions of said collar, and said strap having its ends bent to extend at right angles to said screw and passed through said openings in said collar and into said grooves in said screw.

VICTOR MONTE.